United States Patent
Inokawa

(10) Patent No.: US 10,504,456 B2
(45) Date of Patent: Dec. 10, 2019

(54) DISPLAY CONTROL APPARATUS AND DISPLAY CONTROL METHOD

(71) Applicant: SONY CORPORATION, Tokyo (JP)

(72) Inventor: Hiroyuki Inokawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/578,297

(22) PCT Filed: Jul. 15, 2016

(86) PCT No.: PCT/JP2016/071058
§ 371 (c)(1),
(2) Date: Nov. 30, 2017

(87) PCT Pub. No.: WO2017/018261
PCT Pub. Date: Feb. 2, 2017

(65) Prior Publication Data
US 2018/0144690 A1  May 24, 2018

(30) Foreign Application Priority Data
Jul. 30, 2015  (JP) ................................. 2015-150806

(51) Int. Cl.
*G09G 3/32* (2016.01)
*G09G 3/34* (2006.01)
*H04N 5/57* (2006.01)

(52) U.S. Cl.
CPC ............... *G09G 3/342* (2013.01); *G09G 3/32* (2013.01); *H04N 5/57* (2013.01)

(58) Field of Classification Search
None
See application file for complete search history.

(56) References Cited

U.S. PATENT DOCUMENTS

| 6,278,436 B1 | 8/2001 | Hosoi et al. |
| 2010/0085361 A1* | 4/2010 | Kim ........................ G06T 5/008 |
| | | 345/428 |

(Continued)

FOREIGN PATENT DOCUMENTS

| JP | 11-24631 A | 1/1999 |
| JP | 2009-237510 A | 10/2009 |

(Continued)

OTHER PUBLICATIONS

International Search Report dated Oct. 11, 2016 in PCT/JP2016/071058 filed Jul. 15, 2016.

*Primary Examiner* — Joseph R Haley
(74) *Attorney, Agent, or Firm* — Oblon, McClelland, Maier & Neustadt, L.L.P.

(57) ABSTRACT

The present disclosure relates to a display control apparatus that enables a rise in surface temperature of a display apparatus to be suppressed by lowering a gain value of a high-luminance area, and a display control method.

A display control apparatus according to an aspect of the present disclosure includes: a high-luminance area detection unit that sets a measurement area on a screen of the video signal, calculates an APL value of the set measurement area, and detects a high-luminance area on the basis of a result of a comparison between the calculated APL value and a threshold value; a control unit that causes a LUT, in which an APL value of each pixel is an input and a gain value is an output, to be generated on the basis of the APL value of the detected high-luminance area; an APL value calculation unit that calculates the APL value of each pixel on the basis of pixel values of the video signal; a LUT unit that generates the LUT under control of the control unit and references the generated LUT to output the gain value corresponding to the calculated APL value of each pixel; and a multiplication unit (Continued)

that multiplies the pixel values of the video signal by the output gain value. The present disclosure is applicable to a video monitor.

20 Claims, 14 Drawing Sheets

(56) References Cited

U.S. PATENT DOCUMENTS

| | | |
|---|---|---|
| 2011/0227966 A1 | 9/2011 | Mori |
| 2013/0342587 A1 | 12/2013 | Nakagawa et al. |
| 2014/0152721 A1* | 6/2014 | Byun .................. G09G 3/3208 345/691 |
| 2015/0243250 A1* | 8/2015 | Fukuda .................. G09G 5/02 345/589 |

FOREIGN PATENT DOCUMENTS

| | | |
|---|---|---|
| JP | 2010-139780 A | 6/2010 |
| JP | 2010-224221 A | 10/2010 |
| JP | 5304646 B2 | 10/2013 |
| JP | 2014-6328 A | 1/2014 |

* cited by examiner

A

| | 4K |
|---|---|
| Initial width value of measurement area | 512 |
| Enlargement width | 128 |
| PAR_SIDE_COUNT_MAX | 5 |

Number of enlargements

B

| Size of measurement area | 0 | 1 | 2 | 3 | 4 | 5 |
|---|---|---|---|---|---|---|
| Number of pixels in H/V directions (4K) | 512 | 640 | 768 | 896 | 1024 | 1152 |
| Area (%) | 3% | 5% | 7% | 9% | 12% | 15% |
| Area difference | | 1.7% | 2.0% | 2.4% | 2.8% | 3.1% |

FIG.6

DISPLAY CONTROL APPARATUS AND DISPLAY CONTROL METHOD

TECHNICAL FIELD

The present disclosure relates to a display control apparatus and a display control method, particularly a display control apparatus that is suppressed from becoming high in temperature due to partial high-luminance display on a screen in a light-emitting display that uses an OLED (Organic Light-Emitting Diode), for example, and a display control method.

BACKGROUND ART

Among images to be displayed on a display, dark areas are displayed to become darker and brighter areas are displayed to become brighter, to thus promote HDR (High Dynamic Range) that expresses images more vividly.

Incidentally, in the light-emitting display that uses an OLED and the like, in a case where a bright area of an image is displayed with high luminance (e.g., about 1000 cd/m$^2$), more currents flow in that area than in other areas. Therefore, if the same area is continuously displayed with high luminance, a temperature rises in that area.

Since the OLED is a semiconductor component, if such a local high-temperature state continues in the OLED, there is a possibility that deterioration of luminance characteristics will be accelerated or a correction amount based on a deterioration prediction due to temperature unevenness will be deviated so as to cause color unevenness. Such a problem becomes particularly prominent in a case where pixel signals are converted into HDR signals.

It should be noted that from the past, there exists a function called ABL (Auto Bright Limiter) that corrects luminance of all pixels in a case where APL values (average picture level) of the pixels in an entire screen is high.

CITATION LIST

Patent Literature

Patent Literature 1: Japanese Patent No. 5304646

DISCLOSURE OF INVENTION

Technical Problem

As described above, since the ABL function corrects the luminance of all pixels, it has been unable to cope with local high luminance that may occur in the future due to realization of HDR.

The present disclosure has been made in view of the circumstances as described above and aims at enabling a rise in surface temperature of a display apparatus to be suppressed by lowering a gain value of a high-luminance area.

Solution to Problem

A display control apparatus according to one aspect of the present disclosure is a display control apparatus that locally corrects luminance of a video signal and supplies the video signal whose luminance has been locally corrected to a light-emitting display panel, the display control apparatus including: a high-luminance area detection unit that sets a measurement area on a screen of the video signal, calculates an APL value of the set measurement area, and detects a high-luminance area on the basis of a result of a comparison between the calculated APL value and a threshold value; a control unit that causes a LUT, in which an APL value of each pixel is an input and a gain value is an output, to be generated on the basis of the APL value of the detected high-luminance area; an APL value calculation unit that calculates the APL value of each pixel on the basis of pixel values of the video signal; a LUT unit that generates the LUT under control of the control unit and references the generated LUT to output the gain value corresponding to the calculated APL value of each pixel; and a multiplication unit that multiplies the pixel values of the video signal by the output gain value.

The high-luminance area detection unit is capable of setting the measurement area on the screen of the video signal, calculating the APL value of the set measurement area, and detecting the high-luminance area on the basis of the result of the comparison between the calculated APL value and the threshold value set on the basis of an actual measurement.

The high-luminance area detection unit is capable of setting the measurement area on the screen of the video signal, calculating the APL value of the set measurement area, and detecting the high-luminance area on the basis of a result of a comparison between a maximum value of the calculated APL value and the threshold value.

The high-luminance area detection unit is capable of setting measurement areas of different sizes on the screen of the video signal, calculating the APL value of each of the set measurement areas, and detecting the high-luminance area on the basis of the result of the comparison between the calculated APL values and the threshold value.

The control unit is capable of determining the gain value with which the APL value of the detected high-luminance area can be lowered to a predetermined value, and notifying the LUT unit of the determined gain value.

The control unit is capable of determining the gain value with which the APL value of the detected high-luminance area can be lowered to a predetermined value set on the basis of an actual measurement, and notifying the LUT unit of the determined gain value.

The control unit is capable of causing, in a case where the high-luminance areas of the same size are consecutively detected at the same position on the screen, a nonlinear LUT, in which the APL value of each pixel is the input and the gain value is the output, to be generated on the basis of the APL value of the detected high-luminance area.

The control unit is capable of causing, in a case where the high-luminance areas of the same size are not consecutively detected at the same position on the screen, a linear LUT, in which the APL value of each pixel is the input and the gain value is the output, to be generated.

The display control apparatus according to one aspect of the present disclosure can further include the light-emitting display panel.

The display control apparatus according to one aspect of the present disclosure can further include a notification unit that notifies a user of a position where a local luminance correction is being carried out with respect to the video signal.

A display control method according to one aspect of the present disclosure is a display control method for a display control apparatus that locally corrects luminance of a video signal and supplies the video signal whose luminance has been locally corrected to a light-emitting display panel, the display control method including: by the display control apparatus, a high-luminance area detection step of setting a measurement area on a screen of the video signal, calculating an APL value of the set measurement area, and detecting a high-luminance area on the basis of a result of a comparison between the calculated APL value and a threshold value; a control step of causing a LUT, in which an APL value of each pixel is an input and a gain value is an output, to be generated on the basis of the APL value of the detected high-luminance area; an APL value calculation step of calculating the APL value of each pixel on the basis of pixel values of the video signal; a generation step of generating the LUT; an output step of referencing the generated LUT to output the gain value corresponding to the calculated APL value of each pixel; and a multiplication step of multiplying the pixel values of the video signal by the output gain value.

In the aspect of the present disclosure, the measurement area is set on the screen of the video signal, the APL value of the set measurement area is calculated, and the high-luminance area is detected on the basis of the result of the comparison between the calculated APL value and the threshold value. Further, the LUT in which the APL value of each pixel is the input and the gain value is the output is generated on the basis of the APL value of the detected high-luminance area, the APL value of each pixel is calculated on the basis of the pixel values of the video signal, the generated LUT is referenced so as to output the gain value corresponding to the calculated APL value of each pixel, and the pixel values of the video signal are multiplied by the output gain value.

Advantageous Effects of Invention

According to one aspect of the present disclosure, a rise in surface temperature of a display apparatus can be suppressed.

BRIEF DESCRIPTION OF DRAWINGS

FIG. 6 Diagrams showing numerical values related to the sizes of the measurement area.

MODES FOR CARRYING OUT THE INVENTION

Hereinafter, best modes for embodying the present disclosure (hereinafter, referred to as embodiments) will be described in detail with reference to the drawings.

<Regarding ADP (Auto Doming Protect) Function>

First, an ADP function adopted in a display apparatus as an embodiment of the present disclosure will be described.

The ADP function is a function for detecting a high-luminance area that can presumed as a high-temperature area on a screen and lowering, by setting a gain value for multiplying a high-luminance pixel signal to be smaller than 1 and a gain value for multiplying a pixel signal not of high luminance to 1 on the basis of an APL value of the high-luminance area, luminance of the high-luminance area, to thus perform control so as to prevent a temperature rise in that area.

More specifically, a measurement area is set on the screen, an APL value of the measurement area is calculated, and the high-luminance area is detected on the basis of whether a maximum APL value exceeds a predetermined threshold value.

It should be noted that regarding the temperature, it is assumed that there is a correlation among the APL value of the measurement area, an area (area coefficient) of the measurement area, and a time (time coefficient) during which the high-luminance state continues as in the following expression.

$$\text{Temperature} \propto \text{APL value} * \text{area coefficient} * \text{time coefficient}$$

Here, the APL value is a value obtained by an existing calculation method also used by an ABL function of the past and can be obtained by converting luminance into a current value and averaging it.

The time coefficient is determined on the basis of characteristics of a temperature rise accompanying an elapse of time in a case where the high-luminance state is maintained, and can be regarded as a function such as charging characteristic of a capacitor, for example.

Figure 1:
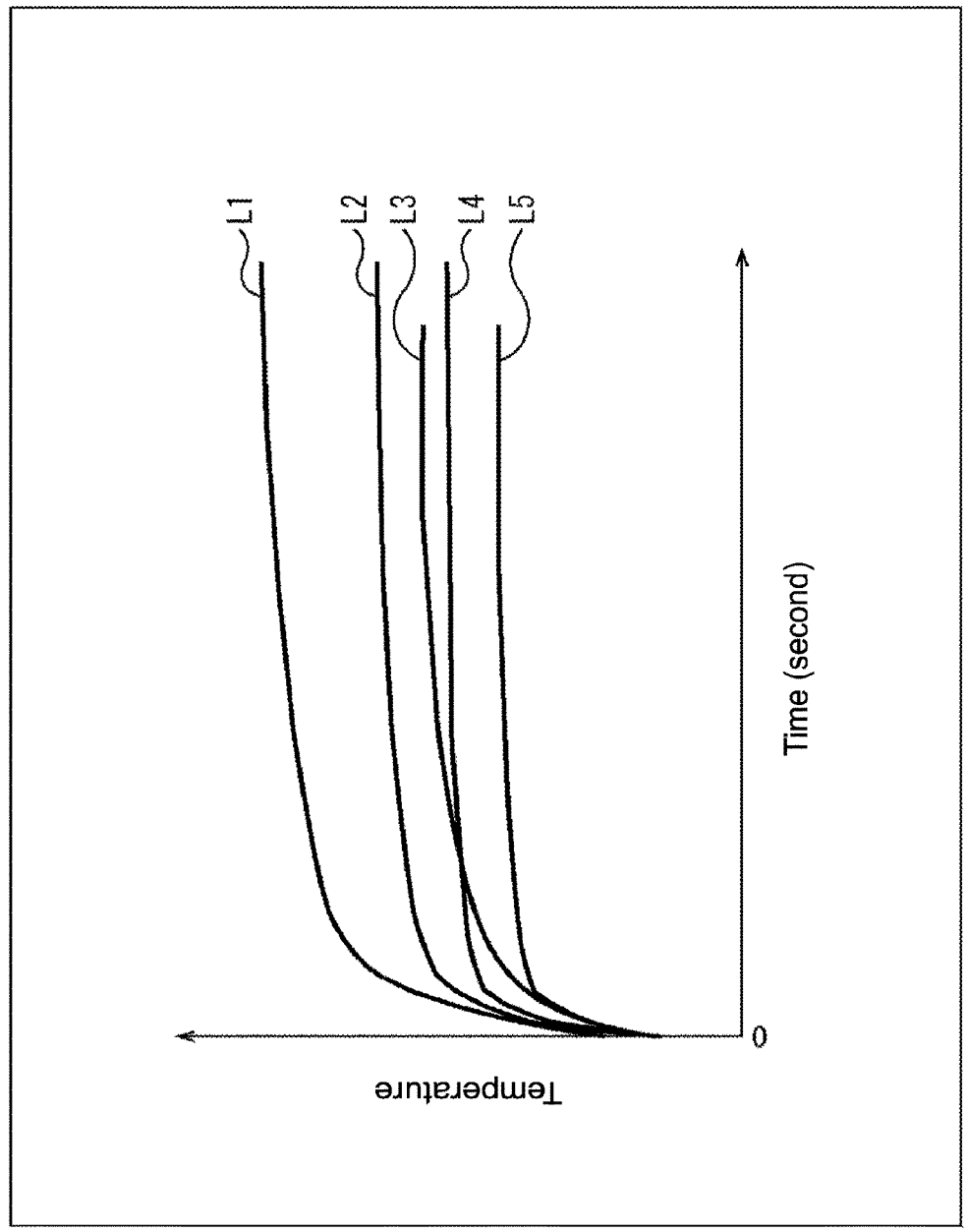
FIG. 1 A diagram showing a relationship between a time and a temperature in a high-luminance state.

FIG. 1 shows the characteristics of a temperature rise in a case where the time has elapsed since performing high-luminance display at a center of a light-emitting display panel. Curves L1, L2, . . . L5 in the figure respectively indicate high-luminance areas having different areas, and the area corresponding to the curve L1 includes a largest area whereas the area corresponding to the curve L5 includes a smallest area.

It can be seen from the figure that in the light-emitting display panel, the larger the area of the high-luminance area is, the higher the temperature becomes. Further, it can be seen that the temperature rise becomes equilibrium after an elapse of a certain time since the start of the high-luminance display. However, it can also be seen that the temperature and a velocity of the rise thereof are not proportional to the area of the high-luminance area.

Therefore, it can be determined that the temperature cannot be necessarily obtained by a calculation that uses the APL value, the area coefficient, and the time coefficient.

In this regard, regarding the area coefficient, temperatures of high-luminance areas of various sizes are measured in place of the area coefficient, and an APL value obtained when reaching a predetermined temperature is set as a threshold value. Then, in a case where an APL value of a measurement area of a certain size exceeds the threshold value corresponding to that size, it is determined that the measurement area has reached the predetermined temperature.

Further, regarding the time coefficient, since the temperature does not largely change at a frame cycle of 1/30 second and the like, an update of a gain value for lowering luminance is also set to correspond to the change of the APL value at intervals of several ten seconds.

<Configuration Example of Display Apparatus as Embodiment of Present Disclosure>

Figure 2:
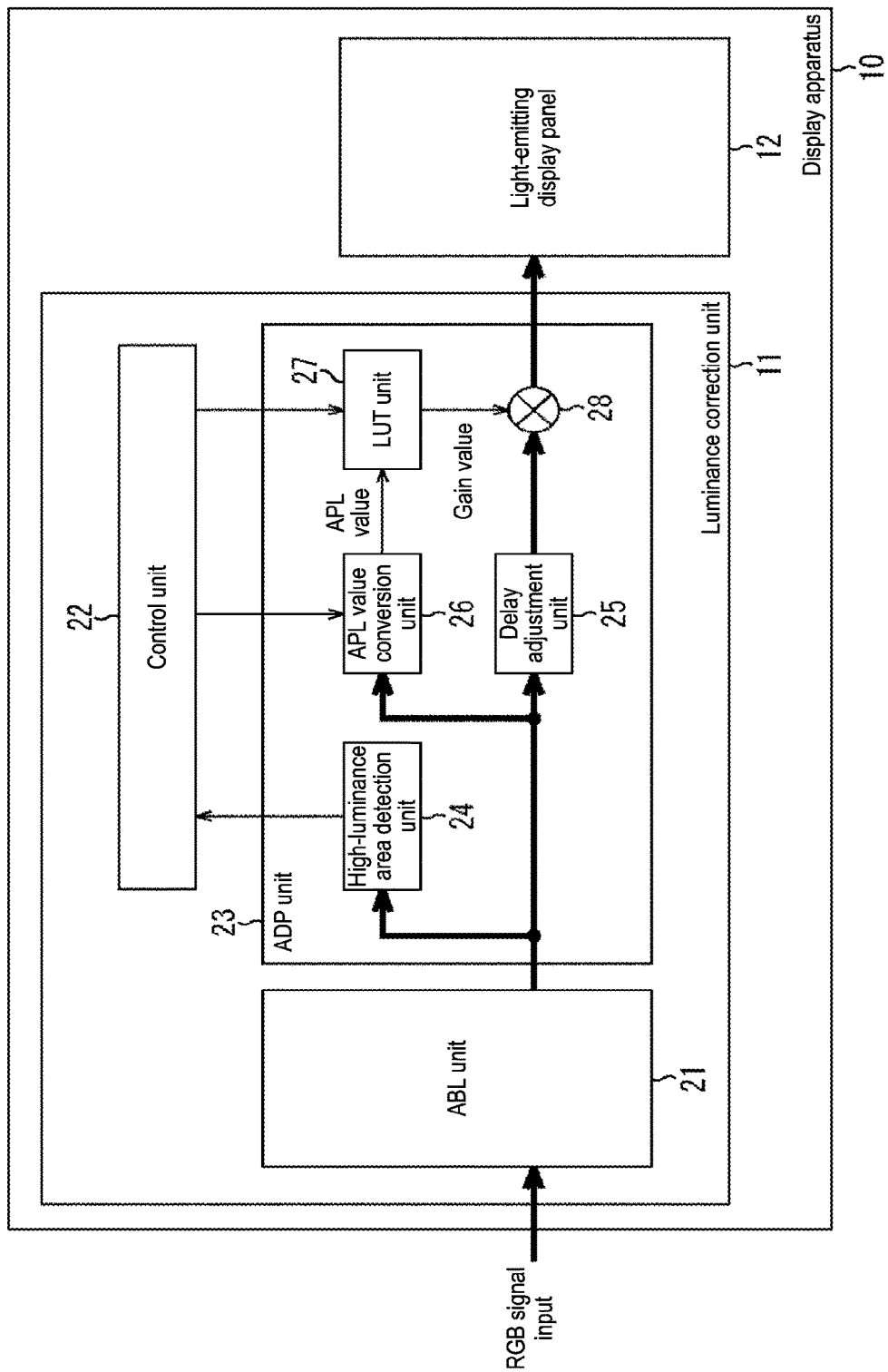
FIG. 2 A block diagram showing a configuration example of a display apparatus to which the present disclosure is applied.

Next, FIG. 2 shows a configuration example of a display apparatus as an embodiment of the present disclosure.

This display apparatus 10 includes a luminance correction unit 11 and a light-emitting display panel 12. The luminance correction unit 11 adjusts luminance of input video signals (RGB signals) and outputs the signals to the light-emitting display panel 12. The light-emitting display panel 12 is a light-emitting-type display device such as an OLED, for example, and displays, with the luminance-adjusted video signals being an input, an image corresponding to the input.

The luminance correction unit 11 includes an ABL unit 21, a control unit 22, and an ADP unit 23.

The ABL unit 21 corrects luminance values of all pixels on the basis of the APL value of the entire screen regarding the video signals input from the previous stage by an ABL function as a prior technology, and outputs the corrected video signals to the ADP unit 23. It should be noted that the ABL unit 21 may be omitted.

The control unit 22 controls the ADP unit 23. Specifically, on the basis of information notified by a high-luminance area detection unit 24 of the ADP unit 23, a gain value of a LUT to be generated by a LUT (Look Up Table) unit 27 of the ADP unit 23 is determined so as to cause a LUT to be generated, or an R current ratio and a B current ratio used for calculating the APL value are supplied to an APL value conversion unit 26 of the ADP unit 23.

The ADP unit 23 is a part that realizes the ADP function described above and includes the high-luminance area detection unit 24, a delay adjustment unit 25, the APL value conversion unit 26, the LUT unit 27, and a multiplication unit 28. These constituent elements are realized by hardware or software.

The high-luminance area detection unit 24 calculates, for each frame of the video signal input from the previous stage, an APL value corresponding to the measurement area while moving the measurement area on the screen, and registers, in a case where a maximum value of the calculated APL values exceeds a threshold value corresponding to the size of the measurement area, the size and position of that measurement area and the maximum value of the APL values. Then, this series of processing is repeated a plurality of times while increasing the size of the measurement area stepwise. As a result, with the position of the registered measurement area being the high-luminance area, the size and position thereof and the maximum value of the APL values exceeding the threshold value are notified to the control unit 22. The detection of a high-luminance area by the high-luminance area detection unit 24 will be described later in detail.

The delay adjustment unit 25 stores the video signal input from the previous stage and outputs the stored video signal to the multiplication unit 28 in accordance with a timing at which a gain value for multiplying each pixel value of that video signal is output from the LUT unit 27 to the multiplication unit 28.

Using the R current ratio and the B current ratio supplied from the control unit 22, the APL value conversion unit 26 calculates the APL value of each pixel of the video signal input from the previous stage in accordance with the following expression and outputs it to the LUT unit 27.

$$\text{APL value} = (G + R*R \text{ current ratio} + B*B \text{ current ratio}) / \text{maximum value}$$

Here, in a case where a current value requisite for displaying G is assumed to be 1, the R current ratio is a current value requisite for displaying R with the same luminance. Similarly, in a case where the current value requisite for displaying G is assumed to be 1, the B current ratio is a current value requisite for displaying B with the same luminance. These are fixed values based on a specification of the light-emitting display panel 12.

The LUT unit 27 generates a LUT in which an input is the APL value and an output is the gain value on the basis of the gain value notified by the control unit 22. Here, the LUT to be generated becomes a nonlinear LUT in which a high-luminance side gain value is lowered in a case where the high-luminance areas of the same size continuously exist at the same position and becomes a linear LUT in which the gain value is constant across the entire luminance range in a case where the high-luminance areas of the same size do not exist or exist but not at the same position.

Further, the LUT unit 27 updates the LUT at time intervals based on control of the control unit 22. However, in updating the LUT, for preventing a drastic change of an image, the gain value is gradually changed to a target gain value using a predetermined number of frames. Furthermore, by referencing the generated LUT, the LUT unit 27 outputs the gain value corresponding to the APL value of each pixel input from the APL value conversion unit 26 to the multiplication unit 28.

The multiplication unit 28 multiplies each pixel value of the video signal output from the delay adjustment unit 25 by the gain value corresponding to the APL value of each pixel, that is input from the LUT unit 27, and outputs it to the subsequent stage.

<Regarding High-Luminance Area Detection Processing by High-Luminance Area Detection Unit 24>

Next, high-luminance area detection processing by the high-luminance area detection unit 24 will be described with reference to FIGS. 3 to 6.

Figure 3:
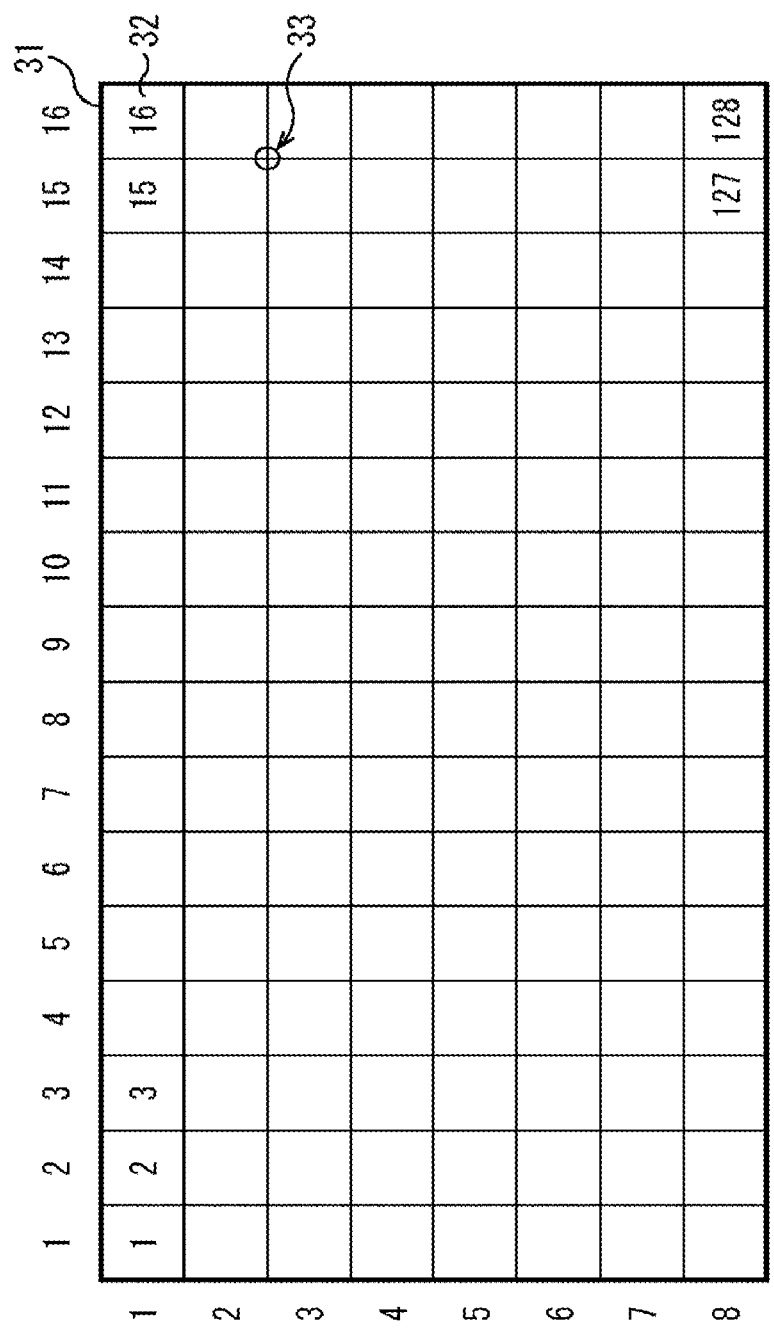
FIG. 3 A diagram showing partition units.

FIG. 3 is a diagram showing partition units to become a movement width at a time a measurement area is moved on an image. It should be noted that below, a case where an image is of a so-called 4K size (4096*2160 pixels) is assumed.

An entire area 31 of an image is sectioned into partition units 32 in each of which the numbers of longitudinal and lateral pixels are substantially equal. The size of the partition unit 32 is about 1% the size of the entire area 31. For example, in a case where the image is of a 4K size, the partition unit 32 is set to be H*V=256*256 pixels. In this case, one partition unit 32 becomes 0.8% the size of the entire area 31, and the entire area 31 is sectioned into 128 (=16*8) partition units 32. Hereinafter, an intersection of frame lines assumed for sectioning the partition units 32 will be referred to as partition intersection 33.

Figure 4:
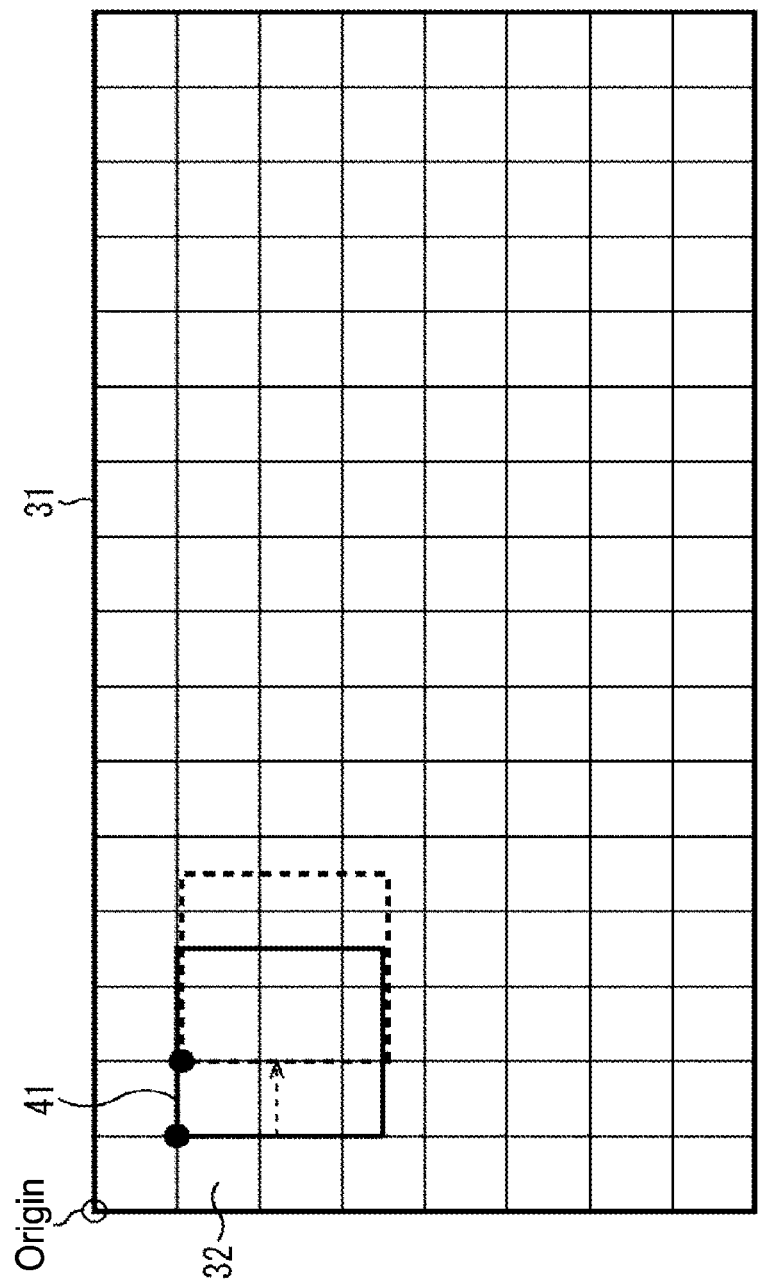
FIG. 4 A diagram showing a movement width of a measurement area.

FIG. 4 shows a measurement area set on an image. It is assumed that a measurement area 41 is obtained by combining 4 partition units 32 or more, and a shape thereof is a quadrate. However, the shape of the measurement area 41 is not limited to a quadrate.

It is assumed that a position of the measurement area 41 is represented by upper-left apex coordinates, and an initial value of that position is an origin of the entire area 31 (e.g., upper left). The measurement area 41 moves from the upper left to the lower right of the entire area 31 by a width of the partition unit 32 such that the upper-left apex of the measurement area 41 overlaps the partition intersection 33.

Figure 5:
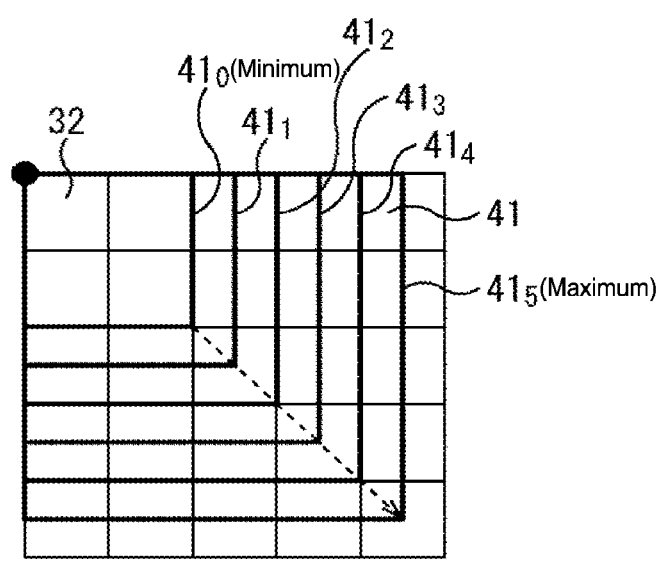
FIG. 5 A diagram showing sizes of the measurement area.

FIG. 5 specifically shows sizes of the measurement area 41 from a minimum size to a maximum size. FIG. 6 show numerical values related to the sizes of the measurement area 41.

As described above, it is assumed that the size of the measurement area 41 corresponds to 4 partition units 32 or more. Therefore, as shown in FIG. 6, an initial width value of the measurement area 41 becomes 512 pixels. Moreover, in a case where an enlargement width of the measurement area 41 is 128 pixels and the number of enlargements is 5, a width of the maximum size of the measurement area 41 becomes 1152 pixels. Hereinafter, the measurement area 41 of the minimum size will be referred to as measurement area $41_0$, the measurement area 41 of a second smallest size will be referred to as measurement area $41_1$, . . . and the measurement area 41 of the maximum size will be referred to as measurement area $41_5$.

In a case where the image is of a 4K size, areas of the measurement areas $41_0$, $41_1$, $41_0$, $41_3$, $41_4$, and $41_5$ respectively become 3%, 5%, 7%, 9%, 12%, and 15% the area of the entire area 31.

<Regarding Setting of Threshold Value and Gain Value>

Next, settings of the threshold value that is to be compared with the APL value and differs for each size of the measurement area 41 and the gain value that is notified from the control unit 22 to the LUT unit 27 to become an output of the LUT will be described.

Figure 7:
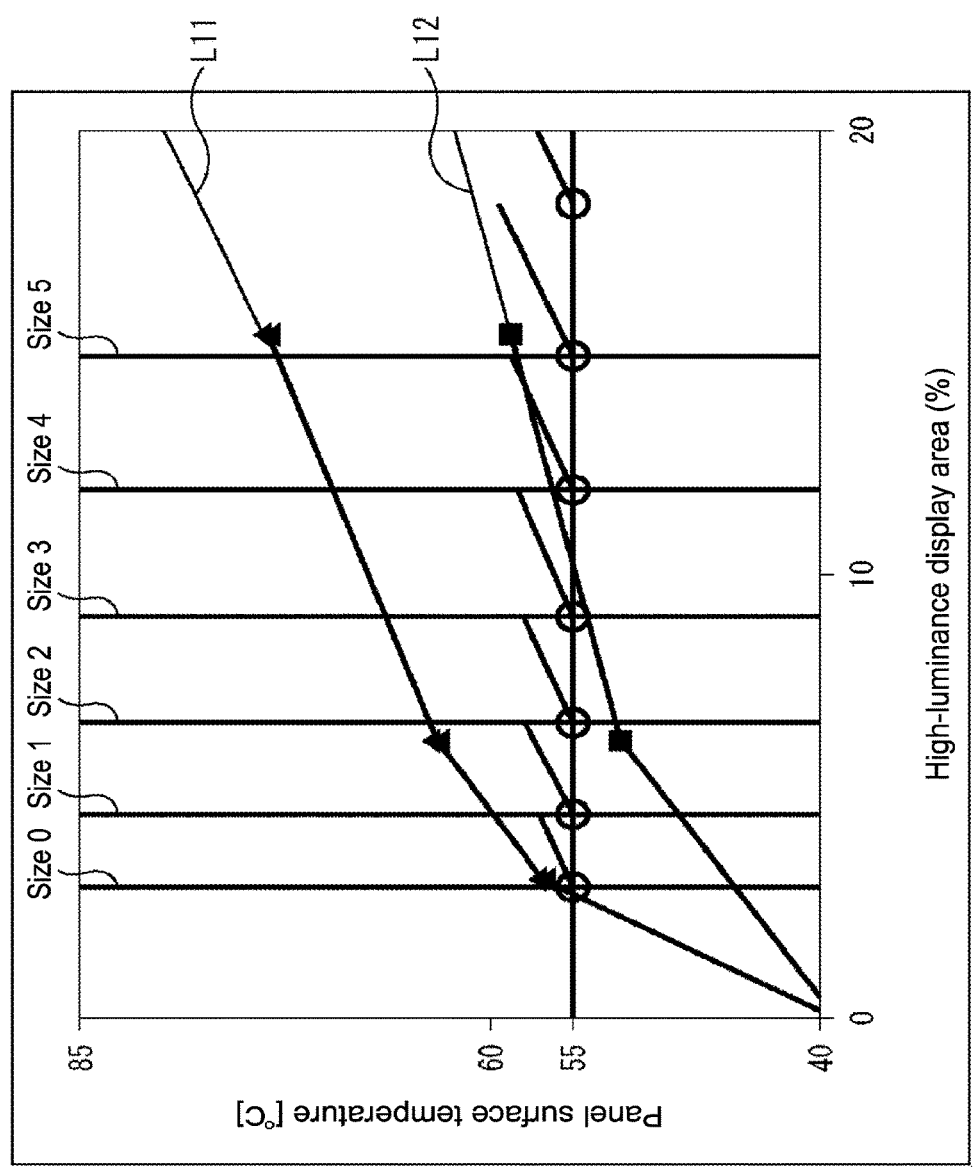
FIG. 7 A diagram showing a relationship between an area and temperature of a high-luminance area having a fixed APL value.

FIG. 7 shows actual measurement values of, in a case where a high-luminance area with a fixed APL value is displayed on the light-emitting display panel 12, an area of the high luminance area and a surface temperature of the light-emitting display panel 12. The abscissa axis in the figure represents a ratio of the area of the high-luminance area to the entire area 31, and the ordinate axis in the figure represents the surface temperature of the light-emitting display panel 12. Further, the curve L11 in the figure corresponds to a case where the APL value is fixed to a maximum value possible, and the curve L12 corresponds to a case where the APL value is fixed to a value smaller than the maximum value. It should be noted that although only the curves L11 and L12 corresponding to the APL values fixed to the two values are shown in the figure, in actuality, curves respectively corresponding to APL values fixed to more values are actually measured. Further, sizes 0 to 6 represented by vertical dotted lines in the figure respectively indicate positions of the measurement areas $41_0$ to $41_5$ on the abscissa axis.

For example, in order to perform control such that the surface temperature of the high-luminance area displayed on the light-emitting display panel 12 does not exceed 60° C., it is only necessary to specify intersections of the horizontal dotted line in the figure where the surface temperature of the light-emitting display panel 12 is lower than 60° C. (e.g., 55° C.) and the vertical dotted lines corresponding to the sizes 0 to 5, and respectively set fixed APL values corresponding to the curves L11, L12, and the like (including those not shown in the figure) that pass the respective specified intersections as a threshold value for each size of the measurement area 41. In other words, the threshold value for each size of the measurement area 41 is set in advance in the high-luminance area detection unit 24 on the basis of the actual measurement values.

Meanwhile, regarding the gain value, the control unit 22 determines a value with which the maximum value of the APL values exceeding the threshold value, which is notified from the high-luminance area detection unit 24, becomes equal to or smaller than the threshold value (APL value), and notifies the LUT unit 27 of the value. Therefore, the gain value is changed in accordance with the input video signal. However, as described above, the LUT does not need to be updated successively and only needs to be updated at intervals of several ten seconds. Further, for preventing a drastic change of a displayed image, the gain value is interpolated in frame units using a time corresponding to a predetermined number of frames to be gradually changed to a target value instead of immediately changing the gain value from 1 to the target value.

<Example of LUT>

Figure 8:
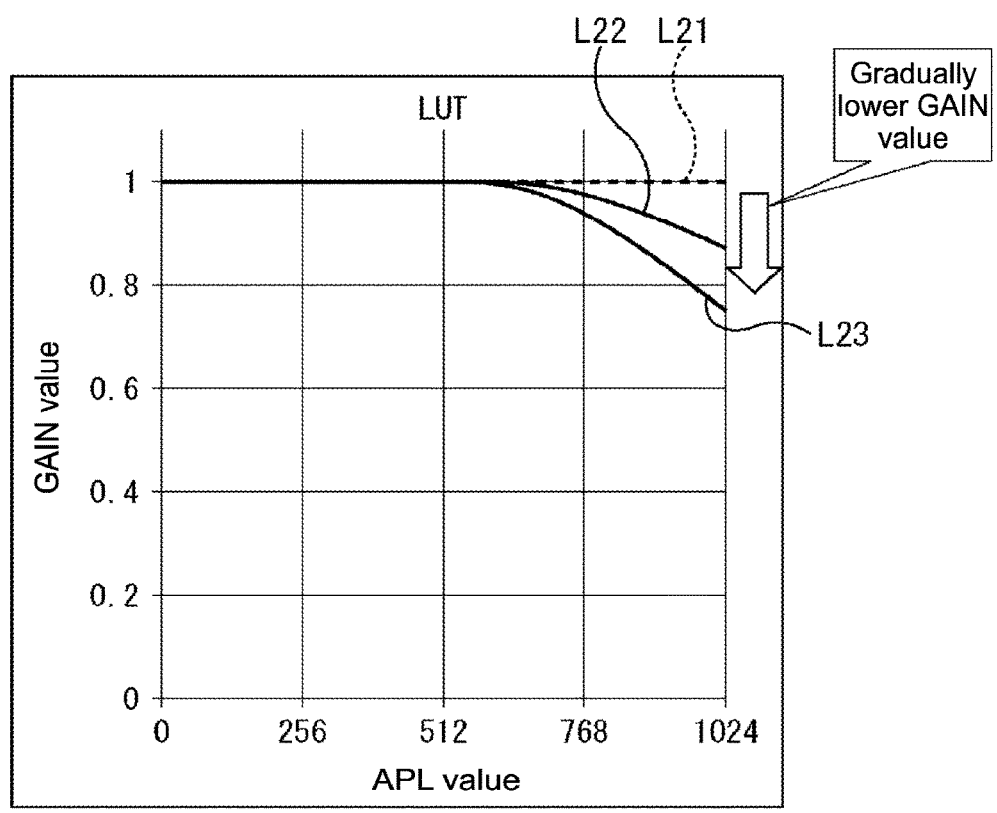
FIG. 8 A diagram showing an example of a LUT.
Figure 9:
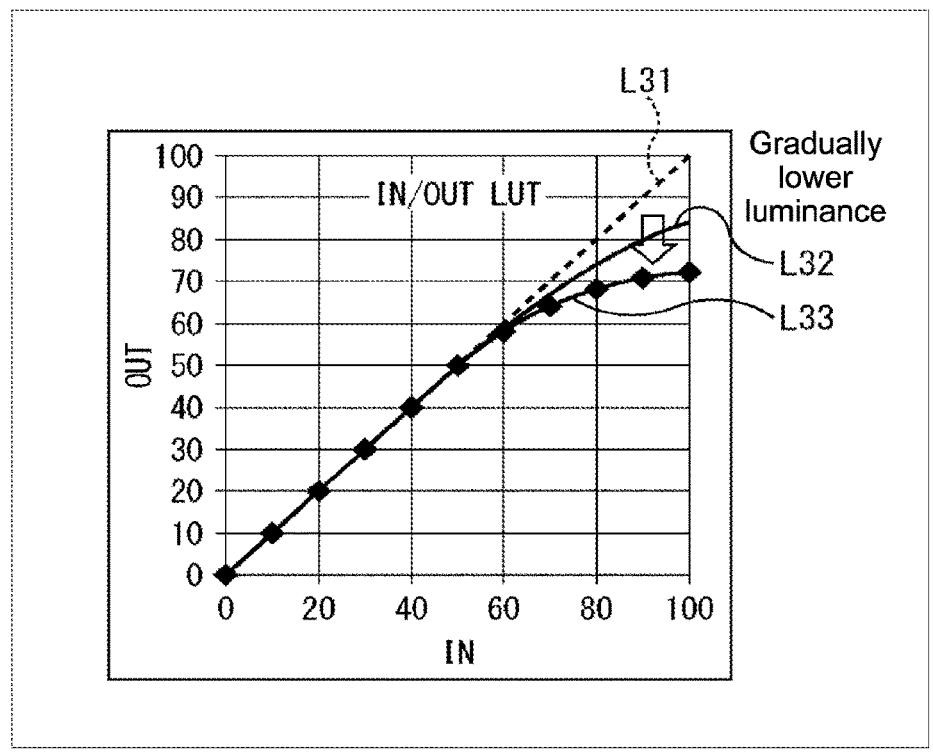
FIG. 9 A diagram showing a relationship between an input and output of a multiplier in a case where the LUT shown in FIG. 9 is applied.

Next, FIG. 8 shows an example of the LUT generated by the LUT unit 27 on the basis of the gain value notified from the control unit 22. The abscissa axis in the figure represents an APL value as an input of the LUT (in a case of 10 bits), and the ordinate axis represents a gain value as an output of the LUT. FIG. 9 shows a relationship between an input (pixel values before luminance correction) and output (pixel values after luminance correction) of the multiplication unit 28 in a case where the LUT shown in FIG. 8 is applied.

The curve L21 shown in FIG. 8 is a linear LUT that is applied when there is no need to suppress high luminance, in which the gain value is constant (1 in figure) across the entire area of the APL value as an input, and the input and output of the multiplication unit 28 in a case where this LUT is applied become the curve L31 shown in FIG. 9.

Further, the curve L23 shown in FIG. 8 is a nonlinear LUT that is applied when suppressing high luminance, in which the gain value is lowered in a high range of the APL value as an input, and the input and output of the multiplication unit 28 in a case where this LUT is applied become the curve L33 shown in FIG. 9.

It should be noted that even in the case of applying the nonlinear LUT indicated by the curve L23, if the linear LUT indicated by the curve L21 is suddenly changed to the nonlinear LUT indicated by the curve L23, a drastic change occurs in the high-luminance area of the image.

In this regard, the LUT unit 27 interpolates the gain value in frame units using a time corresponding to a predetermined number of frames so that a target nonlinear LUT indicated by the curve L23 is generated and applied via generation and application of a LUT corresponding to the curve L22 shown in the figure or the like.

<Operations of Display Apparatus 10>

Next, operations of the display apparatus 10 will be described. It should be noted that operational descriptions of the ABL unit 21 will be omitted.

Figure 10:
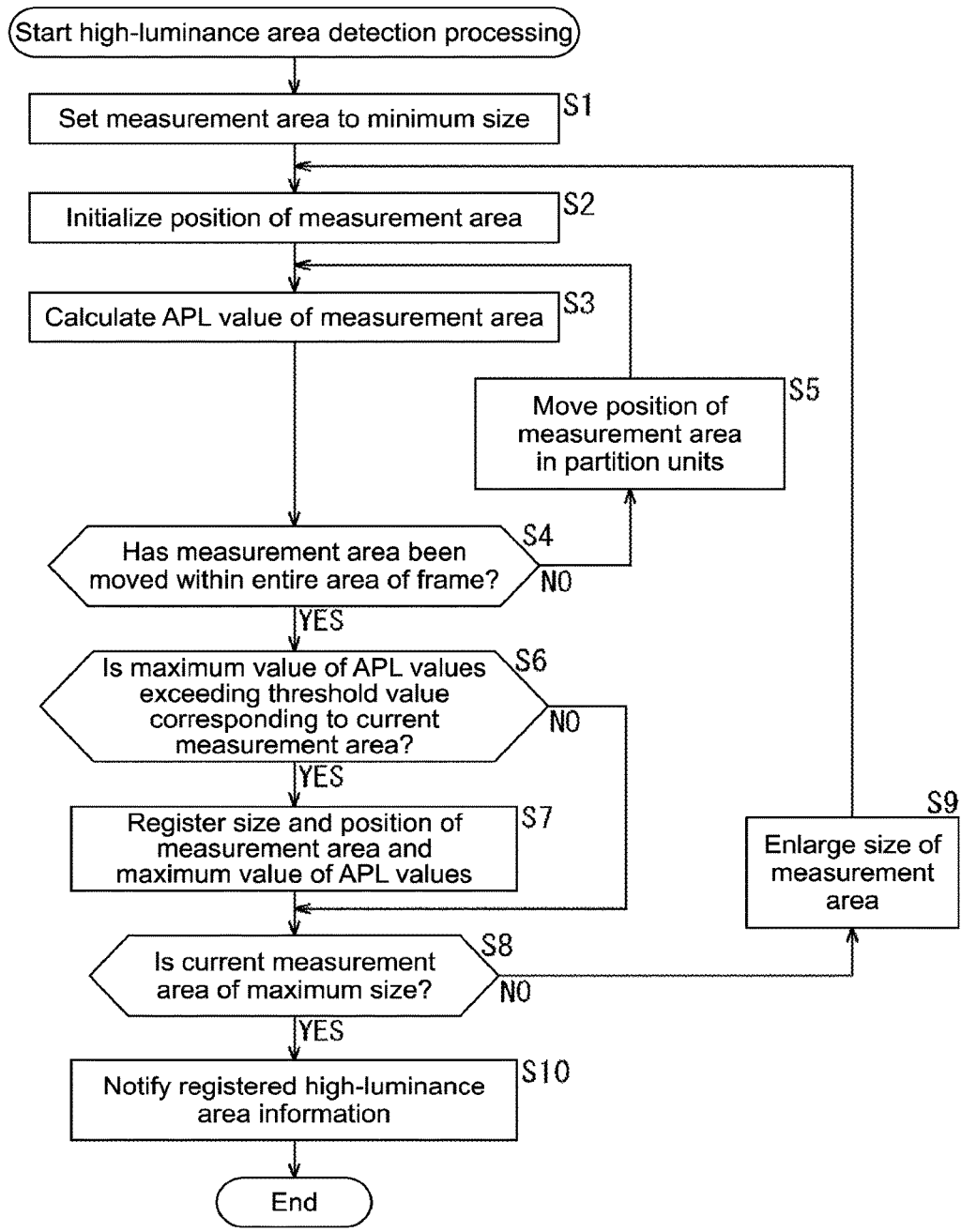
FIG. 10 A flowchart for explaining high-luminance area detection processing.

FIG. 10 is a flowchart for explaining the high-luminance area detection processing.

This high-luminance area detection processing is repetitively executed with each frame of a video signal (RGB signal) input from the previous stage to the high-luminance area detection unit 24 being a processing target.

In Step S1, the high-luminance area detection unit 24 sets the size of the measurement area 41 to be moved on the screen of the video signal input from the previous stage to a size 0 as a minimum size.

In Step S2, the high-luminance area detection unit 24 initializes the position of the measurement area 41. In Step S3, the high-luminance area detection unit 24 calculates and stores an APL value of the current measurement area 41.

In Step S4, the high-luminance area detection unit 24 judges whether the measurement area 41 has been moved within the entire area 31 of the frame as the processing target. In a case where there still is an area not set as the measurement area 41 and the judgment result is NO, the processing advances to Step S5. In Step S5, the high-luminance area detection unit 24 moves the position of the measurement area 41 in the partition units 32. After that, the processing returns to Step S3, and Steps S3 to S5 are repeated.

Meanwhile, in a case where the measurement area 41 has been moved within the entire area 31 of the frame as the processing target and the judgment result of Step S4 is YES, the processing advances to Step S6.

In Step S6, the high-luminance area detection unit 24 judges whether the maximum value of the APL values calculated from the respective measurement areas 41 that have been moved exceeds a preset threshold value corresponding to the measurement area 41 of the current size (in this case, size 0). When the judgment result is YES, a high-luminance area having a size equal to or larger than the size of the measurement area 41 on the screen exists, so the processing advances to Step S7.

In Step S7, the high-luminance area detection unit 24 registers (stores) the size and position of the measurement area 41 whose maximum value of the APL values has been calculated and the maximum value of the APL values exceeding the threshold value.

It should be noted that in a case where the judgment result of Step S6 is NO (in a case where the maximum value of the APL values does not exceed the threshold value), a high-luminance area having a size equal to or larger than the size of the measurement area 41 on the screen does not exist, so the processing of Step S7 is skipped.

In Step S8, the high-luminance area detection unit 24 judges whether the current measurement area 41 is of a maximum size (size 5). When this judgment result is NO, the processing advances to Step S9. In Step S9, the high-luminance area detection unit 24 enlarges the measurement area 41 only by one stage. After that, the processing returns to Step S2, and Steps S2 to S9 are repeated.

It should be noted that in Step S7 carried out while repeating Steps S2 to S9, in a case where the position and size of the measurement area 41 to be registered include a position of the already-registered measurement area 41 having a smaller size, the already-registered position and size are overwritten and registered. Accordingly, the size and position and size of the measurement area 41 corresponding to the high-luminance area occupying a largest area on the frame and the maximum value of the APL values exceeding the threshold value are registered. Hereinafter, the size and position and size of the measurement area 41 corresponding to the high-luminance area occupying a largest area on the frame and the maximum value of the APL values exceeding the threshold value will collectively be referred to as high-luminance area information.

Then, in a case where the measurement area 41 is enlarged to the maximum value (size 5) and thus the judgment result of Step S8 is YES, the processing advances to Step S10.

In Step S10, the high-luminance area detection unit 24 notifies the control unit 22 of the registered high-luminance area information. It should be noted that in a case where there is no registered high-luminance area information, that is, a high-luminance area is not detected from the frame as the current processing target, the processing of Step S10 is omitted.

After that, the high-luminance area detection unit 24 deletes the registered data and ends the high-luminance area detection processing on the frame as the current processing target.

According to the high-luminance area detection processing described above, the high-luminance area detection unit 24 can notify the control unit 22 of the high-luminance area information when detecting a high-luminance area for each frame.

Figure 11:
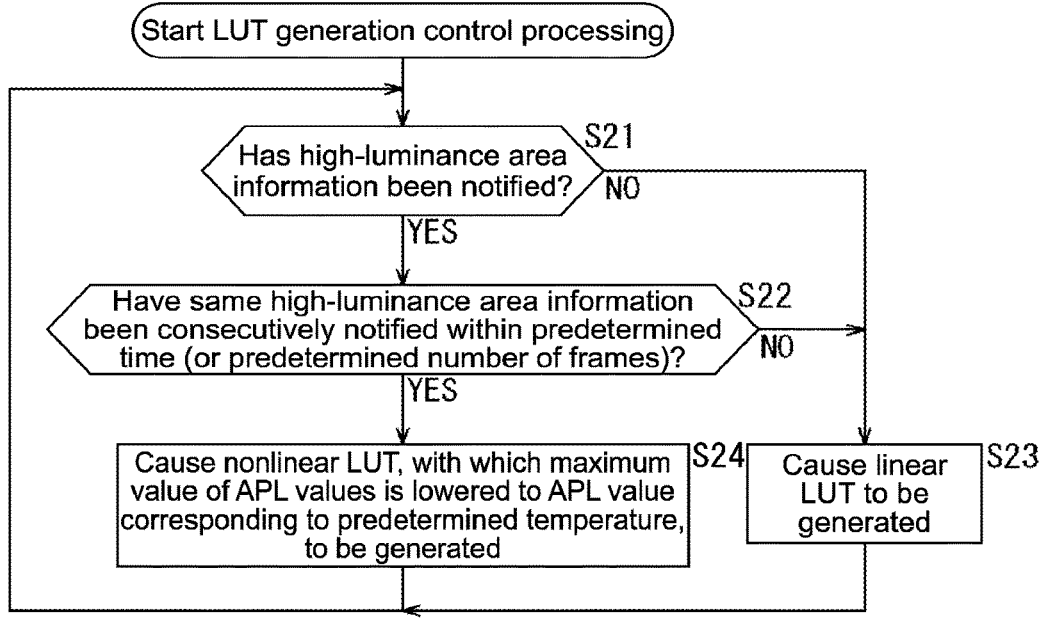
FIG. 11 A flowchart for explaining LUT generation control processing.

Next, FIG. 11 is a flowchart for explaining LUT generation control processing.

In Step S21, the control unit 22 stands by until the high-luminance area information is notified from the high-luminance area detection unit 24, and when notified of the high-luminance area information, the processing advances to Step S22. In Step S22, the control unit 22 judges whether the same high-luminance area information is consecutively notified within a predetermined time (or predetermined number of frames).

When the judgment result of Step S22 is NO, a high-luminance area exists on the screen but the high-luminance area is moving on the screen or changing its size, so it can be considered that there is no possibility that the surface temperature of the light-emitting display panel 12 will rise. In this regard, in this case, luminance of the high-luminance area is not suppressed. Specifically, the processing advances to Step S23, and the control unit 22 causes the LUT unit 27 to generate a linear LUT.

Conversely, when the judgment result of Step S22 is YES, the high-luminance area is continuously displayed at the same position on the screen without moving, so it is considered that there is a possibility that the surface temperature of the light-emitting display panel 12 is rising. In this regard, in this case, luminance of the high-luminance area is suppressed. Specifically, the processing advances to Step S24, and the control unit 22 specifies a gain value for lowering the maximum value of the APL values included in the high-luminance area information to an APL value corresponding to a target temperature, and notifies the LUT unit 27 of the gain value so as to cause it to generate a nonlinear LUT. Under this control, the LUT unit 27 generates a LUT. After that, the processing returns to Step S21, and the subsequent steps are repeated.

Figure 12:
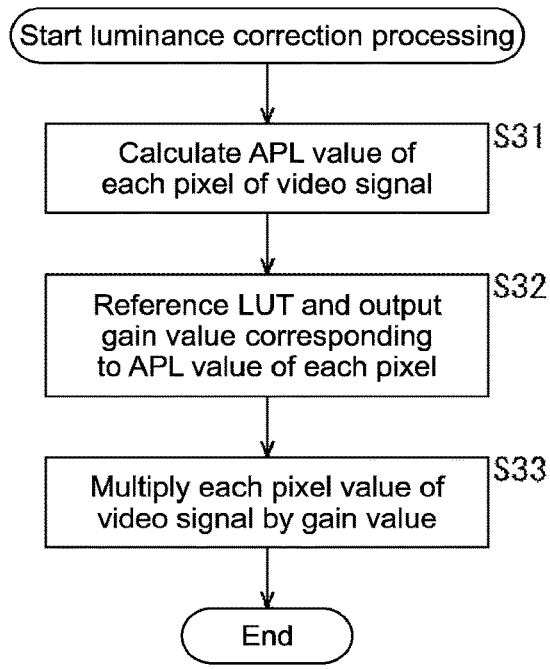
FIG. 12 A flowchart for explaining luminance correction processing.

Next, FIG. 12 is a flowchart for explaining luminance correction processing. This luminance correction processing is repetitively executed with each frame of a video signal (RGB signal) input from the previous stage to the luminance correction unit 11 being a processing target.

In Step S31, the APL value conversion unit 26 calculates an APL value of each pixel in each frame of a video signal input from the previous stage and outputs it to the LUT unit 27. In Step S32, the LUT unit 27 references the generated LUT to output a gain value corresponding to the APL value of each pixel input from the APL value conversion unit 26 to the multiplication unit 28. In Step S33, the multiplication unit 28 multiplies each pixel value of the video signal output from the delay adjustment unit 25 by the gain value corresponding to the APL value of each pixel, that has been input from the LUT unit 27, and outputs the values to the subsequent stage. By the processing described above, the luminance correction processing with respect to one frame of a video signal is ended.

According to the series of high-luminance area detection processing, LUT generation control processing, and luminance correction processing described above, luminance of only a high-luminance area that may cause a rise in the surface temperature of the light-emitting display panel 12 can be suppressed. Therefore, it is possible to suppress the rise in the surface temperature of the light-emitting display panel 12 and suppress an occurrence of a situation that may be caused in a case where a local high-temperature state continues in the light-emitting display panel 12, that is, a situation where deterioration of luminance characteristics is accelerated or a correction amount based on a deterioration prediction due to temperature unevenness is deviated so as to cause color unevenness.

<Modified Example of High-Luminance Area Detection Processing>

In the high-luminance area detection processing described above, the measurement area 41 is sequentially changed from the size 0 to the size 5 for each frame irrespective of the size of the high-luminance area detected in the previous frame. In this case, if the time required for one size of the measurement area 41 is T seconds, 6T seconds are required for each frame.

In Modified Example 1, in a case where a high-luminance area of a size 3 is detected in a certain frame, for example, the measurement area 41 is changed in the stated order of the size 0, size 3, size 1, size 3, size 2, size 3, size 4, size 3, size 5, and size 3 using the size 3 of the measurement area 41 as a reference in subsequent frames. By changing the size of the measurement area 41 in this way, it is possible to check whether a high-luminance area of the size 3 exists at the same position at intervals of 2T seconds. By this Modified Example 1, a timed required for the processing of Steps S21 and S22 in the LUT generation control processing can be shortened, and in a case where the high-luminance area has disappeared from the screen or the like, for example, it is possible to readily return to the linear LUT.

In Modified Example 2, in a case where a high-luminance area of the size 3 is detected in a certain frame, for example, the high-luminance area detection processing is executed, and in parallel with this, the size 3 is fixed without changing the size of the measurement area 41, and the high-luminance area detection processing from which the enlargement of the size of the measurement area 41 is omitted is executed in subsequent frames. Also in this Modified Example 2, the time required for the processing of Steps S21 and S22 in the LUT generation control processing can be shortened.

<Countermeasure with Respect to 4K-Supporting Video Signal>

Figure 13:
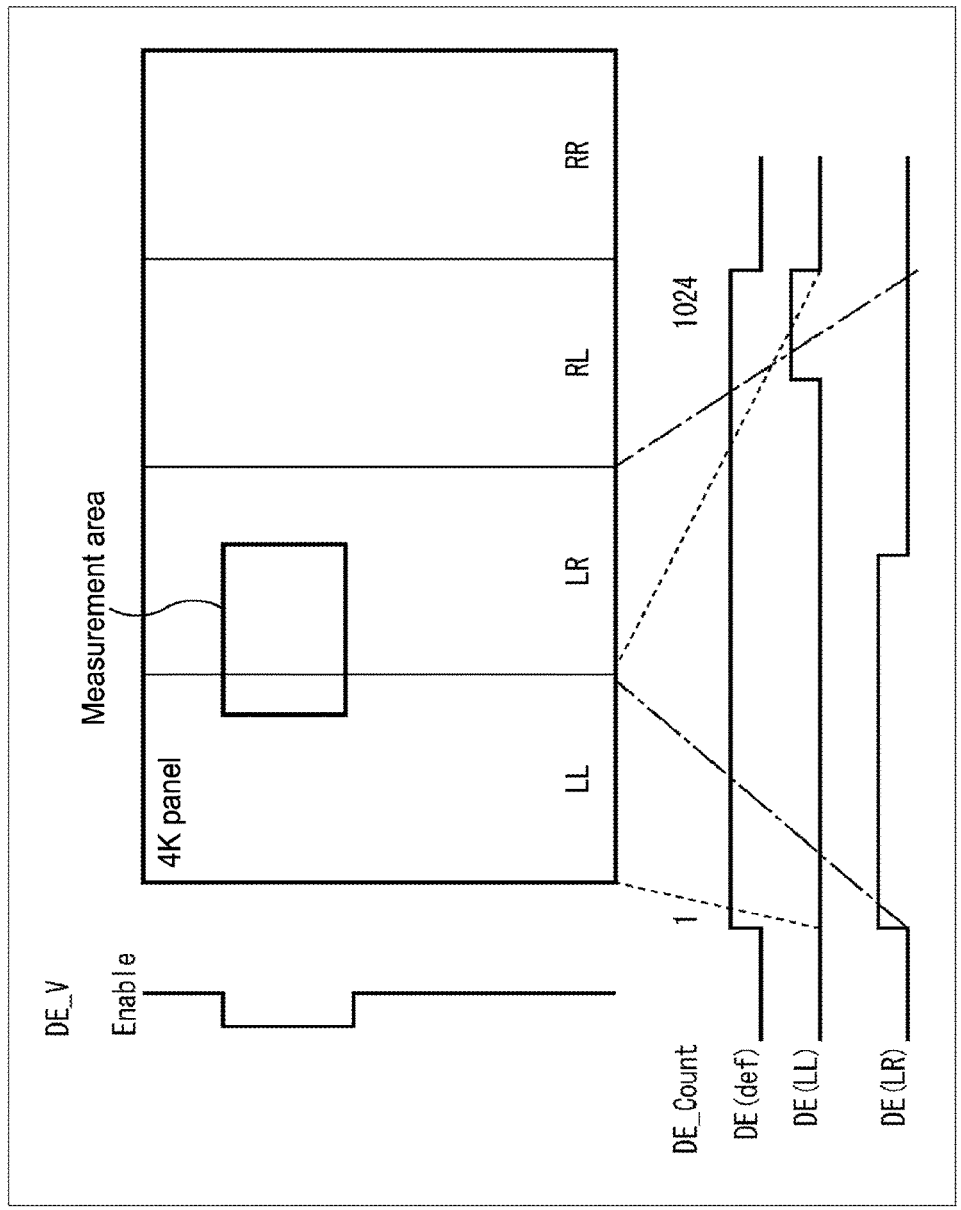
FIG. 13 A diagram for explaining a coping process with respect to 4K-supporting video signals.

Next, FIG. 13 is a diagram for explaining a coping process with respect to a 4K-supporting video signal.

In a normal case (video signal of the past not supporting 4K), a video signal is configured by coupling pixel signals of an entire frame. In contrast, a 4K-supporting video signal is divided into vertically-long rectangular areas LL, LR, RL, and RR as shown in FIG. 13 and configured as 4 pieces of data. These 4 pieces of data are subjected to parallel processing so as to display a 4K screen.

In a case of setting the measurement area 41 across different rectangular areas LL and LR as shown in the figure, a DE (Data Enable) signal only needs to be output as shown in the figure.

<Shape of Measurement Area 41>

Figure 14:
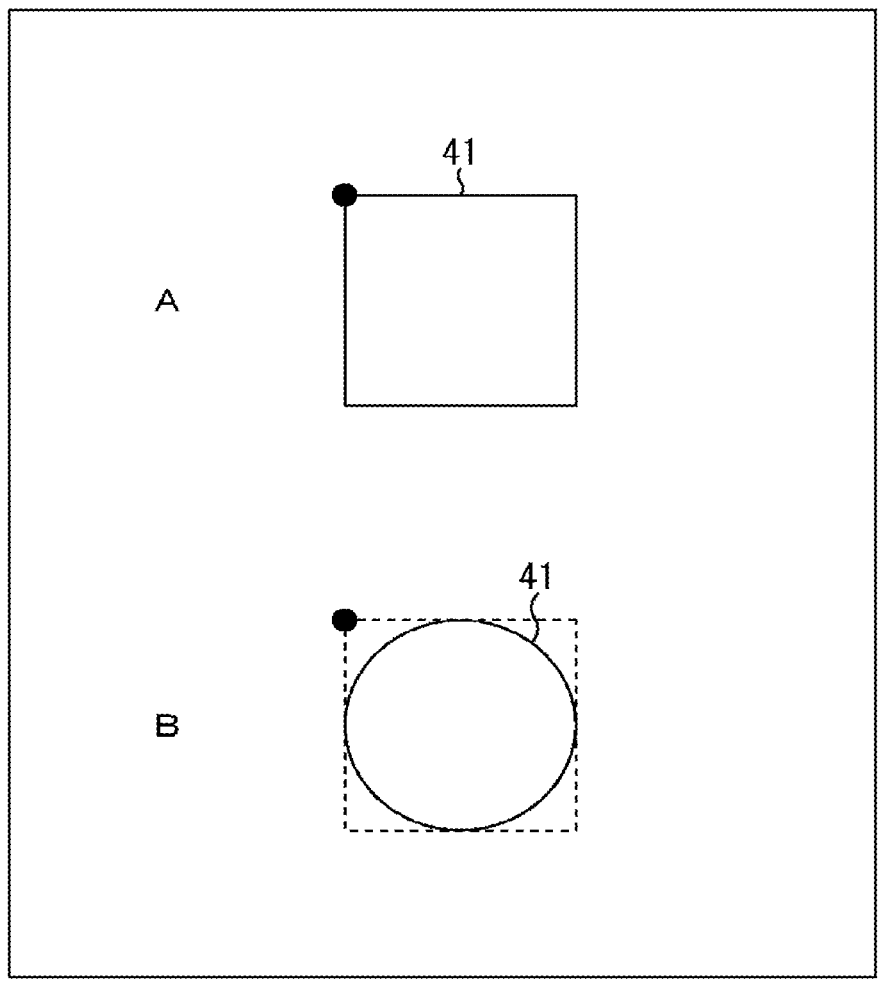
FIG. 14 Diagrams showing examples of a shape of the measurement area.

FIG. 14 show examples of the shape of the measurement area 41. Although the shape of the measurement area 41 is a quadrate as shown in FIG. 14A in the embodiment described above, it may also take a circular shape as shown in FIG. 14B in consideration of temperature radiation characteristics of the light-emitting display panel 12. In a case where the shape of the measurement area 41 is a circle, high-luminance area detection errors can be reduced more than in the case where the shape is a quadrate.

<Another Configuration Example of Display Apparatus 10>

Figure 15:
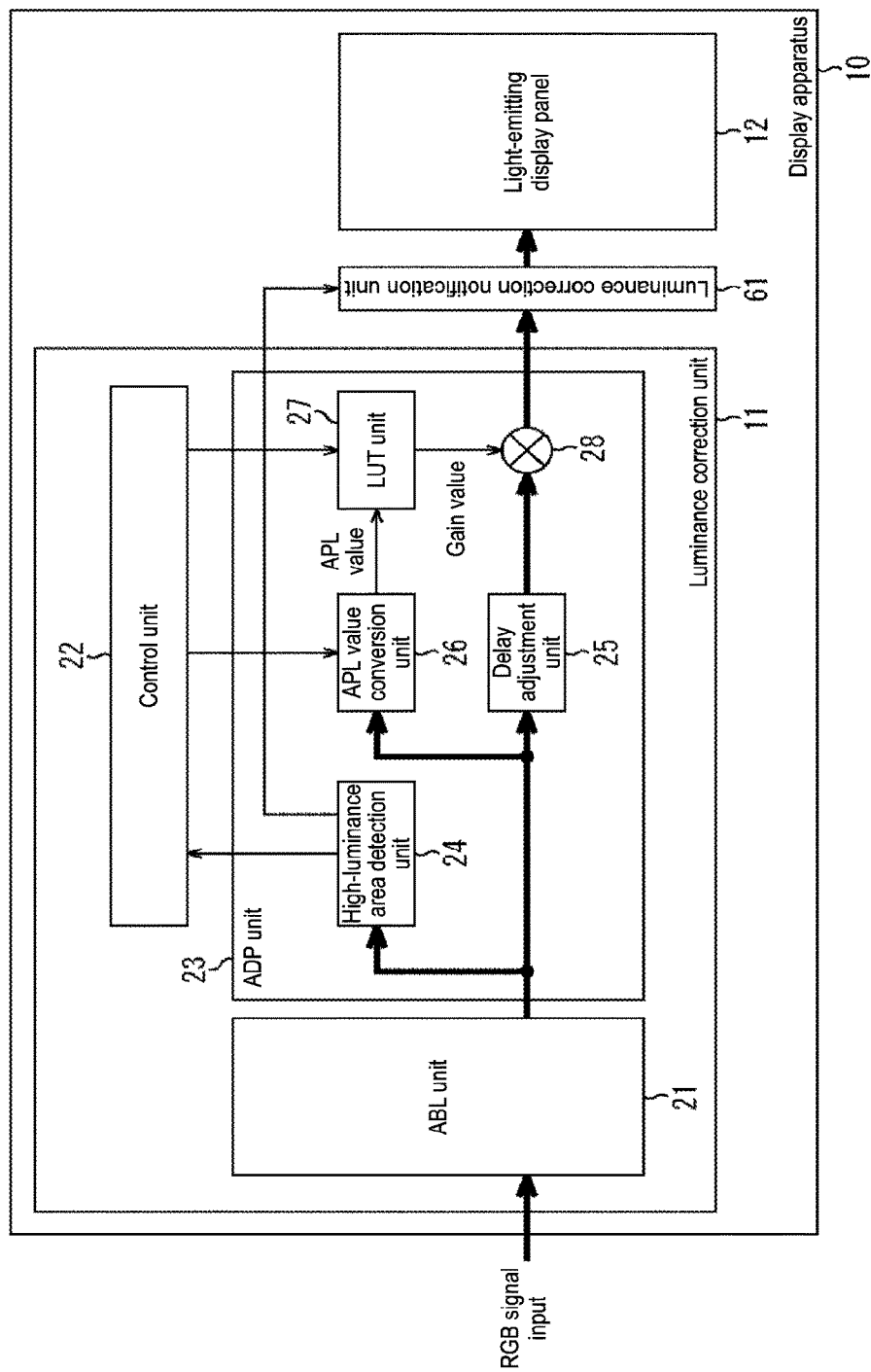
FIG. 15 A block diagram showing another configuration example of the display apparatus to which the present disclosure is applied.

Next, FIG. 15 shows another configuration example of the display apparatus 10 as the embodiment of the present disclosure.

The another configuration example shown in FIG. 15 is obtained by adding a luminance correction notification unit 61 between the luminance correction unit 11 and the light-emitting display panel 12 in the configuration example shown in FIG. 2.

The luminance correction notification unit 61 includes a function of notifying, in a case where a luminance correction is carried out on a high-luminance area on a screen by the luminance correction unit 11, a user of that position. By providing the luminance correction notification unit 61, the user can grasp whether an image displayed on the light-emitting display panel 12 has been subjected to a local luminance correction. Further, in a case where the local luminance correction has been performed, it is possible the easily check a position thereof.

It should be noted that it is also possible to enable the local luminance correction by the luminance correction unit 11 to be stopped in accordance with an instruction from the user who has confirmed that the local luminance correction has been performed.

<Application Example of Display Apparatus 10>

The display apparatus 10 as the embodiment of the present disclosure is applicable to a television receiver that displays video contents of television programs and the like, for example, and is particularly favorable as a professional-use video monitor that creates and edits video contents and is used in broadcast stations and the like, for example.

It should be noted that the embodiment of the present disclosure is not limited to the embodiment described above and can be variously modified without departing from the gist of the present disclosure.

The present disclosure can also take the following configurations.

(1) A display control apparatus that locally corrects luminance of a video signal and supplies the video signal whose luminance has been locally corrected to a light-emitting display panel, the display control apparatus including:

a high-luminance area detection unit that sets a measurement area on a screen of the video signal, calculates an APL value of the set measurement area, and detects a high-luminance area on the basis of a result of a comparison between the calculated APL value and a threshold value;

a control unit that causes a LUT, in which an APL value of each pixel is an input and a gain value is an output, to be generated on the basis of the APL value of the detected high-luminance area;

an APL value calculation unit that calculates the APL value of each pixel on the basis of pixel values of the video signal;

a LUT unit that generates the LUT under control of the control unit and references the generated LUT to output the gain value corresponding to the calculated APL value of each pixel; and a multiplication unit that multiplies the pixel values of the video signal by the output gain value.

(2) The display control apparatus according to (1), in which the high-luminance area detection unit sets the measurement area on the screen of the video signal, calculates the APL value of the set measurement area, and detects the high-luminance area on the basis of the result of the comparison between the calculated APL value and the threshold value set on the basis of an actual measurement.

(3) The display control apparatus according to (1) or (2), in which
the high-luminance area detection unit sets the measurement area on the screen of the video signal, calculates the APL value of the set measurement area, and detects the high-luminance area on the basis of a result of a comparison between a maximum value of the calculated APL value and the threshold value.

(4) The display control apparatus according to any one of (1) to (3), in which
the high-luminance area detection unit sets measurement areas of different sizes on the screen of the video signal, calculates the APL value of each of the set measurement areas, and detects the high-luminance area on the basis of the result of the comparison between the calculated APL values and the threshold value.

(5) The display control apparatus according to any one of (1) to (4), in which
the control unit determines the gain value with which the APL value of the detected high-luminance area can be lowered to a predetermined value, and notifies the LUT unit of the determined gain value.

(6) The display control apparatus according to (5), in which
the control unit determines the gain value with which the APL value of the detected high-luminance area can be lowered to a predetermined value set on the basis of an actual measurement, and notifies the LUT unit of the determined gain value.

(7) The display control apparatus according to any one of (1) to (6), in which
the control unit causes, in a case where the high-luminance areas of the same size are consecutively detected at the same position on the screen, a nonlinear LUT, in which the APL value of each pixel is the input and the gain value is the output, to be generated on the basis of the APL value of the detected high-luminance area.

(8) The display control apparatus according to any one of (1) to (7), in which
the control unit causes, in a case where the high-luminance areas of the same size are not consecutively detected at the same position on the screen, a linear LUT, in which the APL value of each pixel is the input and the gain value is the output, to be generated.

(9) The display control apparatus according to any one of (1) to (8), further including
the light-emitting display panel.

(10) The display control apparatus according to any one of (1) to (9), further including
a notification unit that notifies a user of a position where a local luminance correction is being carried out with respect to the video signal.

(11) A display control method for a display control apparatus that locally corrects luminance of a video signal and supplies the video signal whose luminance has been locally corrected to a light-emitting display panel, the display control method including:
by the display control apparatus,
a high-luminance area detection step of setting a measurement area on a screen of the video signal, calculating an APL value of the set measurement area, and detecting a high-luminance area on the basis of a result of a comparison between the calculated APL value and a threshold value;
a control step of causing a LUT, in which an APL value of each pixel is an input and a gain value is an output, to be generated on the basis of the APL value of the detected high-luminance area;
an APL value calculation step of calculating the APL value of each pixel on the basis of pixel values of the video signal;
a generation step of generating the LUT;
an output step of referencing the generated LUT to output the gain value corresponding to the calculated APL value of each pixel; and
a multiplication step of multiplying the pixel values of the video signal by the output gain value.

REFERENCE SIGNS LIST 10 display apparatus
11 luminance correction unit
12 light-emitting display panel
21 ABL unit
22 control unit
23 ADP unit
24 high-luminance area detection unit
25 delay adjustment unit
26 APL value conversion unit
27 LUT unit
28 multiplication unit
31 entire area
32 partition unit
33 partition intersection
41 measurement area
61 luminance correction notification unit

The invention claimed is:
1. A display control apparatus, comprising:
processing circuitry configured to
set a measurement area of an image of a video signal,
calculate an average picture level (APL) value of the set measurement area, and
detect a high-luminance area on the basis of a result of a comparison between the calculated APL value and a threshold value at which a temperature of the set measurement area on a reference display is determined to exceed a predetermined temperature.

2. The display control apparatus according to claim 1, wherein
the threshold value is set on the basis of an actual measurement where temperatures of set measurement areas on the reference display with different sizes are measured corresponding to each of a series of possible APL values applied to the set measurement areas.

3. The display control apparatus according to claim 1, wherein the processing circuitry is further configured to:
set multiple measurement areas of the image of the video signal,
calculate multiple APL values of the multiple set measurement areas, and
detect the high-luminance area on the basis of a result of a comparison between a maximum value of the calculated multiple APL values and the threshold value.

4. The display control apparatus according to claim 1, wherein the processing circuitry is further configured to:
set measurement areas of different sizes of the image of the video signal,
calculate APL values of each of the set measurement areas, and detect the high-luminance area on the basis of the result of a comparison between the calculated APL values and the threshold value.

5. The display control apparatus according to claim 1, wherein the processing circuitry is further configured to:
   determine a gain value with which the APL value of the detected high-luminance area can be lowered to a predetermined value, and
   notify a look up table (LUT) circuit of the determined gain value.

6. The display control apparatus according to claim 5, wherein
   the predetermined value is set on the basis of an actual measurement.

7. The display control apparatus according to claim 1, wherein the processing circuitry is further configured to:
   in response to high-luminance areas of the same size being consecutively detected at the same position on the image, generate a nonlinear LUT, in which an APL value of each pixel is an input and a gain value is an output, on the basis of the APL value of the detected high-luminance area that is one of the high-luminance areas.

8. The display control apparatus according to claim 7, wherein the processing circuitry is further configured to:
   when no high-luminance areas of the same size at the same position on the image are detected during an interval, generate a linear LUT, in which an APL value of each pixel is an input and a gain value is an output.

9. The display control apparatus according to claim 1, wherein the processing circuitry is further configured to:
   indicate that a local luminance correction is being carried out at a position of the measurement area of the image.

10. The display control apparatus of claim 1, wherein the processing circuitry is further configured to:
    generate a LUT, in which an APL value of each pixel is an input and a gain value is an output, on the basis of the APL value of the detected high-luminance area;
    calculate the APL value of each pixel on the basis of pixel values of the video signal;
    output the gain value corresponding to the calculated APL value of each pixel based on the generated LUT; and
    multiply the pixel values of the video signal by the output gain value.

11. The display control apparatus according to claim 1, further comprising
    a light-emitting display panel to which the multiplied pixel values of the video signal are displayed.

12. A display control method, comprising:
    setting a measurement area of an image of a video signal,
    calculating an average picture level (APL) value of the set measurement area; and
    detecting, by processing circuitry of a display control apparatus, a high-luminance area on the basis of a result of a comparison between the calculated APL value and a threshold value at which a temperature of the set measurement area on a reference display is determined to exceed a predetermined temperature.

13. The method of claim 12, further comprising:
    generating a look up table (LUT), in which an APL value of each pixel is an input and a gain value is an output, on the basis of the APL value of the detected high-luminance area;
    calculating the APL value of each pixel on the basis of pixel values of the video signal;
    output the gain value corresponding to the calculated APL value of each pixel based on the generated LUT; and
    multiplying the pixel values of the video signal by the output gain value.

14. The display control method according to claim 12, wherein the threshold value is set on the basis of an actual measurement where temperatures of set measurement areas on the reference display with different sizes are measured corresponding to each of a series of possible APL values applied to the set measurement areas.

15. The display control method according to claim 12, further comprising:
    setting multiple measurement areas of the image of the video signal;
    calculating multiple APL values of the multiple set measurement areas; and
    detecting the high-luminance area on the basis of a result of a comparison between a maximum value of the calculated multiple APL values and the threshold value.

16. The display control method according to claim 12, further comprising:
    setting measurement areas of different sizes of the image of the video signal;
    calculating APL values of each of the set measurement areas; and
    detecting the high-luminance area on the basis of the result of a comparison between the calculated APL values and the threshold value.

17. The display control method according to claim 12, further comprising:
    determining a gain value with which the APL value of the detected high-luminance area can be lowered to a predetermined value, and notifying a LUT circuit of the determined gain value.

18. The display control method according to claim 12, wherein the predetermined value is set on the basis of an actual measurement.

19. The display control method according to claim 12, further comprising:
    in response to high-luminance areas of the same size being consecutively detected at the same position on the image, generating a nonlinear LUT, in which an APL value of each pixel is an input and a gain value is an output, on the basis of the APL value of the detected high-luminance area that is one of the high-luminance areas.

20. The display control method according to claim 19, further comprising:
    when no consecutive high-luminance areas of the same size at the same position on the image are detected during an interval, generating a linear LUT, in which an APL value of each pixel is an input and a gain value is an output.

* * * * *